United States Patent
Field et al.

(10) Patent No.: US 10,204,241 B2
(45) Date of Patent: Feb. 12, 2019

(54) THEFT AND TAMPER RESISTANT DATA PROTECTION

(71) Applicant: MICROSOFT TECHNOLOGY LICENSING, LLC, Redmond, WA (US)

(72) Inventors: Scott A. Field, Redmond, WA (US); Aravind N. Thoram, Sammamish, WA (US); John Michael Walton, Redmond, WA (US); Dayi Zhou, Redmond, WA (US); Alex M. Semenko, Issaquah, WA (US); Avraham Michael Ben-Menahem, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/639,613

(22) Filed: Jun. 30, 2017

(65) Prior Publication Data

US 2019/0005274 A1    Jan. 3, 2019

(51) Int. Cl.
*H04L 29/06* (2006.01)
*G06F 21/86* (2013.01)
*G06F 21/12* (2013.01)
*H04L 9/14* (2006.01)
*H04L 9/32* (2006.01)
(Continued)

(52) U.S. Cl.
CPC ............ *G06F 21/86* (2013.01); *G06F 21/126* (2013.01); *G06F 21/40* (2013.01); *G06F 21/575* (2013.01); *H04L 9/14* (2013.01); *H04L 9/3213* (2013.01); *H04L 29/06* (2013.01)

(58) Field of Classification Search
None
See application file for complete search history.

(56) References Cited

U.S. PATENT DOCUMENTS

| | | | |
|---|---|---|---|
| 9,239,925 B2 | 1/2016 | Cumming et al. | |
| 9,646,172 B1 | 5/2017 | Hahn et al. | |
| 9,762,548 B2 * | 9/2017 | Cocotis | H04L 63/0428 |

(Continued)

OTHER PUBLICATIONS

"SNIA—Storage Security Industry Forum; Solutions Guide for Data-At-Rest", https://www.trustedcomputinggroup.org/wp-content/uploads/SSIF_Solutions_Guide_for_Data-at-Rest.pdf, 2009, pp. 1-36.

(Continued)

*Primary Examiner* — Jeffery L Williams
(74) *Attorney, Agent, or Firm* — Workman Nydegger

(57) ABSTRACT

Systems and methods are provided for adding security to client data by maintaining keys providing access to the client data remotely from the client data. In some circumstances, the systems encrypt a cluster of data using an encryption key, associate the cluster of encrypted data with a unique identifier and send the unique identifier and the decryption key to a server for storage. The decryption key is then received from the server and is used to decrypt the cluster of encrypted data. A server can also perform policy checks or trigger additional authentication such as SMS, phone, or email notification before allowing access to a key. Furthermore, in some instances, the server can also prevent access to the stored keys in response to anomalies, such as decommissioning and other asset management events.

8 Claims, 11 Drawing Sheets

(51) Int. Cl.
*G06F 21/40* (2013.01)
*G06F 21/57* (2013.01)

(56) References Cited

U.S. PATENT DOCUMENTS

| | | | |
|---|---|---|---|
| 9,825,919 B2* | 11/2017 | Lambert | H04L 9/0861 |
| 9,871,653 B2* | 1/2018 | Weis | H04L 67/16 |
| 9,935,767 B2* | 4/2018 | White | H04L 9/0844 |
| 2006/0143476 A1 | 6/2006 | McGovern | |
| 2007/0237325 A1 | 10/2007 | Gershowitz et al. | |
| 2008/0082680 A1* | 4/2008 | Grewal | G06F 9/4416 709/232 |
| 2012/0204032 A1* | 8/2012 | Wilkins | H04L 9/006 713/170 |
| 2013/0145160 A1 | 6/2013 | Bursell | |
| 2013/0145447 A1 | 6/2013 | Maron | |
| 2014/0019798 A1* | 1/2014 | Allison | G06F 17/30067 714/4.3 |
| 2014/0258725 A1 | 9/2014 | Shea et al. | |
| 2016/0162693 A1 | 6/2016 | Breuer et al. | |
| 2016/0300080 A1 | 10/2016 | Shah et al. | |
| 2018/0063101 A1* | 3/2018 | Clark | H04L 63/061 |
| 2018/0145955 A1* | 5/2018 | Nirwal | H04L 9/0894 |

OTHER PUBLICATIONS

Taylor, Christine, "Data Storage: Who's Got the Encryption Key", http://www.enterprisestorageforum.com/.../data-storage-whos-got-the-encryption-key.html, Apr. 3, 2014, 3 pages.

* cited by examiner

THEFT AND TAMPER RESISTANT DATA PROTECTION

BACKGROUND

In contemporary computer systems and networking, computer users access data that is stored and managed in a variety of storage configurations, including traditional on-premise environments and in data server center environments. Such data may be subject to theft or tampering. For instance, it is possible for disks to be mishandled during decommissioning and it is also possible for malware and spyware to be installed on the storage devices or host system.

Physical access to an organization's secure areas, equipment, or materials containing sensitive data make it possible for a malicious insider to steal or damage the stored data. For example, a janitor or other building contractor may steal physical disks, other storage devices or even an entire computer system. Further, beyond physical theft and/or mishandling of the storage hardware, an operating system may be implanted with malicious software by unauthorized personnel that have physical access to the storage media. Malicious software could infiltrate or destroy data, or maintain persistent unauthorized access, amongst other problems.

Additionally, in computer networking, a hacker may manipulate the normal behavior of network connections and connected systems. Hackers may use scripts or other software to attack computer networks, manipulating data passing through a network connection in ways designed to obtain more information about the target system or obtain access to the data. According to some estimates, there are over one million new unique malware samples discovered each year. Unlike worms and mass-mailers of the past, many new viruses are extremely targeted to particular industries, companies and even users, making them more difficult to detect and prevent.

Most computer systems are eventually cycled out of service. However, sensitive data often remains on the storage devices of these systems. Sometimes, that computer or storage device is recycled, resold, left to collect dust in a closet, or can fall into a malicious person's hand. There are several popular methods that companies use to remove data from decommissioned storage devices. However, deleting data with the operating system may only remove pointers to the data, not the data itself, so the data can actually still be recovered. Other processes for removing the data can be bulky, time consuming to use, expensive and dangerous, and in the end, the data may still be readable.

Accordingly, there is an ongoing need to provide methods for adding security to data that is maintained on storage devices, particularly for storage devices that are susceptible to theft and/or tampering.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed embodiments are directed towards systems and methods for improving security of stored data by encrypting data and by maintaining the decryption keys separately from the encrypted data.

In some embodiments, a user generates a cluster of data using a client system, the cluster of data is encrypted using an encryption key and is also associated with a unique key identifier. In one embodiment, the client system sends the unique key identifier and a corresponding decryption key to a server for storage. When a user needs to access the cluster of encrypted data, the client system sends a communication request to the server that has access to a key ID database that stores the decryption key and receives a communication response from the server. The client system then sends the unique key ID to the server. In one embodiment, sending the unique key ID may be achieved using a boot manager, such that the client sends a request for boot code and receives the boot code from the server. In another embodiment, sending the unique key ID may be achieved by embedding the boot code in the client system's firmware. After sending the unique key identifier to the server, the client system receives the decryption key from the server and decrypts the cluster of encrypted data using the decryption key.

On the server side, the server receives the unique key identifier and the decryption key. The server stores the unique key identifier and the decryption key in the key ID database. When a user needs to access the cluster of encrypted data, the server receives a communication request from a client system and sends a communication response to the client system. Then, the server fetches the unique key ID stored in the cluster of encrypted data that the client system is requesting to access. In one embodiment, fetching the unique key ID may be achieved via boot manager, such that the server receives a request for boot code from the client system and initiates a boot manager loading the boot code. Through the boot code, the server obtains the unique key identifier stored in the cluster of encrypted data that the client system is requesting to access. In another embodiment, fetching the unique key ID may be achieved via accessing boot code embedded in the firmware of client system. After receiving the unique key ID, the server then searches the key ID database for a match. In response to finding a match, the server retrieves the decryption key associated with the key identifier and sends the decryption key to the client system.

In another embodiment, after the client system encrypts a cluster of data and creates a unique key ID of the clustered encrypted data. The unique key ID may comprise a certificate thumbprint. The decryption key is further encrypted using a public key. A private key is interrelated to the pubic key and is configured to decrypt the encrypted decryption key. The client system stores the encrypted decryption key and the unique key ID in the cluster of encrypted data as metadata, then sends the private key and the unique key ID to a server for storage. When a user needs to access the encrypted data again, the client system sends a communication request to the server and receives a response from the server granting the request. The client system then sends the unique key ID and the encrypted decryption key to the server. In one embodiment, the action of sending the unique key ID and the encrypted decryption key to the server is achieved by using a boot manager initiating boot code, such that after receiving boot code from the server, the client sends the unique key ID and the encrypted decryption key to the server. It will be noted, however, that the boot code can be obtained prior to or subsequent to initiating the process for accessing the key. In one embodiment, sending the unique key ID may be achieved by embedding the boot code in the client system's firmware. The client system then receives a decrypted decryption key from the server and decrypts the cluster of encrypted data using the decrypted decryption key.

On the server side, the server receives a unique key ID and a private key that is configured for decrypting the encrypted decryption key from the client system. The server stores the private key and the unique key ID in a key ID database. When a user needs to access a cluster of encrypted data, the server receives a communication request from the client system and sends a communication response to the client system. Then, the server fetches a unique key ID and the encrypted decryption key that are stored in the cluster of encrypted data as metadata. In one embodiment, fetching the unique key ID may be achieved by initiating a boot manager, such that after receiving a request for boot code from the client system, the server initiates a boot manager that provides boot code to the client. Alternatively, the boot manager can be installed prior to receiving the aforementioned communication request from the client system.

Through the boot manager, and execution of the boot code at the client, the server receives a unique key ID and an encrypted decryption key stored in metadata of the cluster of encrypted data that the client system requests to access. In another embodiment, fetching the unique key ID and encrypted decryption key may be achieved via accessing boot code embedded in the firmware of client system. After receiving the unique key ID, the server then searches the key ID database for a match unique key ID. In response to finding a match, the server retrieves the private key that is associated with the unique key ID and decrypts the encrypted decryption key using the private key, and sends the decrypted decryption key to the client system.

In another embodiment, after a cluster of data is generated and encrypted, the client system creates a unique key ID of the cluster of encrypted data. The unique key ID may comprise a certificate thumbprint. The client system sends the decryption key and the unique key ID to a server to be encrypted, using a symmetric key that is stored at the server. The client system receives the encrypted decryption key from the server and stores the encrypted decryption key along with the unique key ID in the cluster of data maintained at the client as metadata. When a user needs to access the cluster of data, the client system sends a communication request to the server and receives a response from the server granting the request. Then, the client system sends the unique key ID and the encrypted decryption key to the server. In one embodiment, sending the unique key ID and the encrypted decryption key may be achieved by initiating a boot manager from the server, such that the client system sends a request for boot code. After receiving the boot code from the server (which could be received prior to the server receiving the unique key ID and/or without the client sending a request for the boot code), the client sends the unique key ID and the encrypted decryption key to the server. In another embodiment, sending the unique key ID and encrypted decryption key may be achieved by running the boot code embedded in the firmware of the client system. After sending the unique key ID and the encrypted decryption key to the server, the client receives the decrypted decryption key from the server, which was decrypted by the server with the symmetric key. Finally, the client decrypts the cluster of data using the decrypted decryption key received from the server.

On the server side, the server receives a unique key ID and a decryption key from the client system. It encrypts the decryption key using the stored symmetric key and sends the encrypted decryption key to the client system for storage. The server stores the symmetric key and the unique key ID in a key ID database. When a user needs to access the encrypted data, the server receives a communication request from the client system and sends a communication response to the client system. The server then fetches the unique key ID and the encrypted decryption key from the metadata of the cluster of encrypted data. In one embodiment, fetching the unique key ID and the encrypted decryption key may be achieved by initiating a boot manager, sending boot code to the client system. Through the boot manager and executing boot code, the server receives the unique key ID and the encrypted decryption key stored in the metadata of the cluster of encrypted data that the client system is requesting access to. In another embodiment, fetching the unique key ID and the encrypted decryption key may be achieved by initiating boot code embedded in the firmware of the client system. After receiving the unique key ID and the encrypted decryption key, the server searches the key ID database for a match. In response to finding a match, the server retrieves the symmetric key associated with the unique key ID, decrypts the encrypted decryption key using the symmetric key, and sends the decrypted decryption key to the client system.

By storing access keys at a server, remotely from the stored client data, and by implementing certain protocols for a client to obtain the access keys, it is possible to improve the security of the stored client data, as described herein.

Additional features and advantages will be set forth in the description which follows, and in part will be obvious from the description, or may be learned by the practice of the teachings herein. Features and advantages of the embodiments may be realized and obtained by means of the instruments and combinations particularly pointed out in the appended claims. Features of the embodiments will become more fully apparent from the following description and appended claims, or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
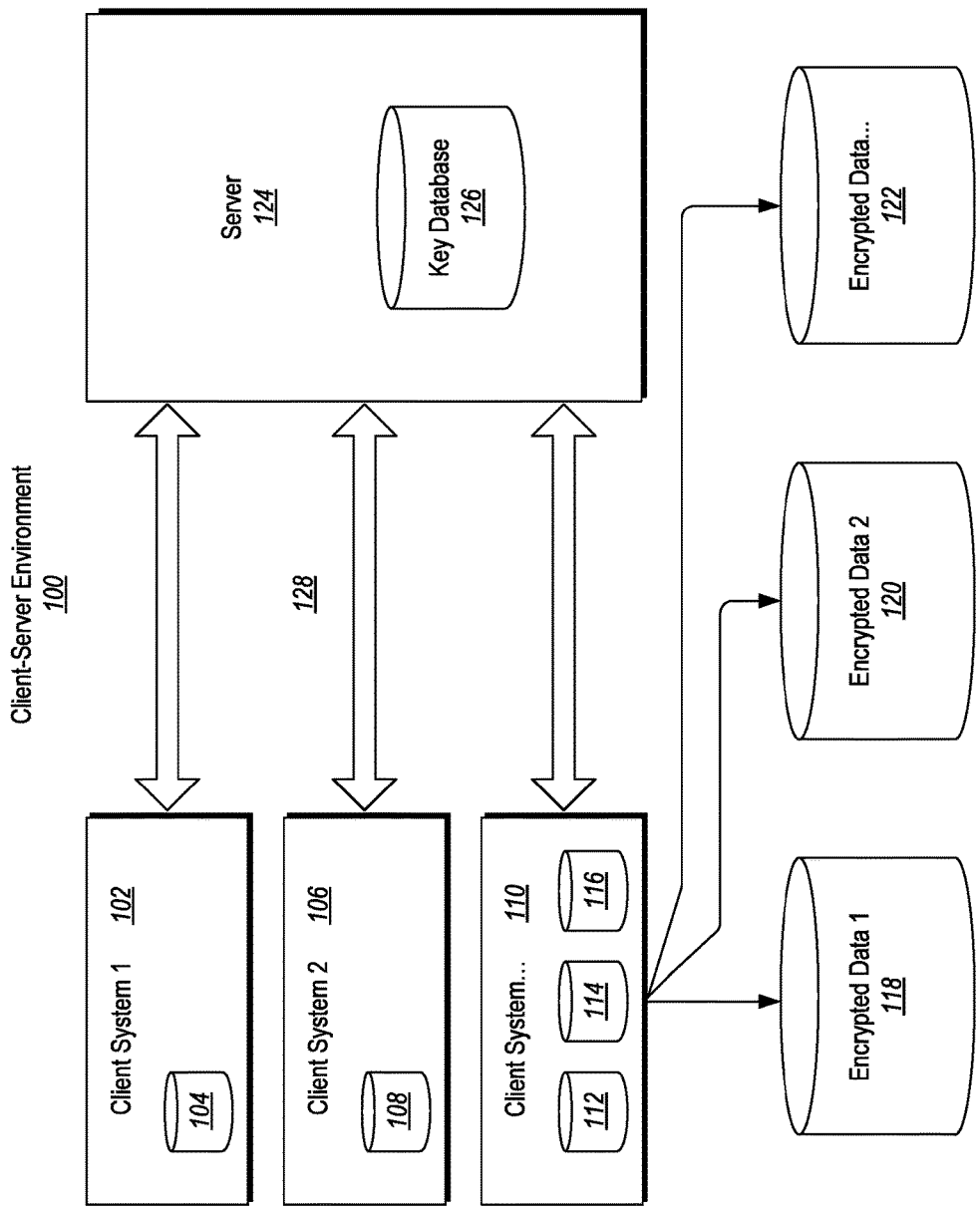
FIG. 1 illustrates a client-server environment in which client data is encrypted and the decryption keys are stored on a data server.

Disclosed embodiments are directed towards systems and methods for improving security of stored data, by helping to keep encrypted client data tamper resistant, by encrypting data and by also maintaining the keys for decrypting/accessing the encrypted data separately from the encrypted data.

In some embodiments, a user encrypts a data set (sometimes referred to, herein, as a cluster of data) using an encryption key and associates the encrypted data with a unique key identifier. The client sends the unique key identifier and a corresponding decryption key to a server for storage. The client does not separately keep a copy of the decryption key at the client. Then, when a user needs to access the encrypted data, the client system obtains the decryption key from the server by following certain protocols. For instance, the client sends a communication request to the server and receives a communication response from the server. The client system then sends a request for boot code and receives the boot code from the server. The client also provides the unique key identifier to the server, which sometimes occurs during execution of the boot code. In response to providing the unique key identifier to the server, the client system receives the decryption key from the server and decrypts the cluster of encrypted data using the decryption key.

In another embodiment, after the client system encrypts the data, the client creates a unique key ID of the encrypted data. The unique key ID may comprise a certificate thumbprint. The decryption key is further encrypted using a public key. A corresponding private key configured to decrypt the encrypted decryption key is sent to the server, without being maintained/stored at the client. The client system stores the encrypted decryption key and the unique key ID as metadata. The private key and unique key ID are sent to and stored by the server or a system that is accessible to the server. When a user needs to access the encrypted data again, the client system sends a communication request to the server and receives a response from the server granting the request. The client then sends a request for boot code. After receiving boot code from the server, the client sends the unique key ID and the encrypted decryption key to the server. This triggers the server sending the decrypted decryption key to the client, such that the client is enabled to decrypt the cluster of encrypted data using the decrypted decryption key.

In yet another embodiment, the client stores a decryption key with the encrypted data, but not in a format that can be used by the client. In particular, the decryption key is encrypted until it is needed and it is only decrypted in response to the client following certain security protocols with a server that decrypts the decryption key. In this embodiment, the client system creates a unique key ID of encrypted data and sends the corresponding decryption key for decrypting the data to a server to be encrypted. The unique key ID may also be a certificate thumbprint. The server encrypts the decryption key using a symmetric key that is stored at the server. The client system receives the encrypted decryption key from the server and stores the encrypted decryption key along with the unique key ID in the cluster of data maintained at the client as metadata. When a user needs to access the cluster of data, the client system sends a communication request to the server and receives a response from the server granting the request. Then, the client system sends a request for boot code. During execution of the boot code, the client sends the unique key ID and the encrypted decryption key to the server. Next, the client receives the decrypted decryption key from the server, which is decrypted by the server with the symmetric key, and decrypts the encrypted data with the newly received/decrypted decryption key.

The disclosed embodiments for helping to keep encrypted client data tamper resistant may be implemented by a computing system, as described in the following disclosure, which includes one or more client and/or server systems.

FIG. 1 illustrates one example of a client-server environment 100 that can be used to implement certain aspects of the invention. In this environment, client data sets (104, 108, 112, 114, 116, 118, 120, and 122) are encrypted and maintained by various client systems 102, 106, 110. Corresponding decryption keys for decrypting the data sets are maintained in a key database 126 that is stored on and/or accessible to a remote server 124.

Client systems 102, 106 and 110 and server 124 communicate over one or more network connections 128, using wired and/or wireless components and protocols. In some instances, the server 124 communicates with the client system(s) 102, 106 and 110 using the trivial file transfer protocol (TFTP) and/or Network Key Protector Unlock Protocol (NKPU).

The client data may be stored locally in any combination of one or more storage locations that are coupled to or accessible to the client system(s). For example, client system 102 includes storage 104, the client system 106 includes storage 108, and the client system 110 includes multiple storage containers/locations 112, 114 and 116. The client data may also be stored in a remote network and/or distributed storage. For example, some of the data for client system 100 is stored in network storages 118, 120 and 122. There may be one or more client systems communicating with one or more servers. The ellipsis 110 represents that there may be one or more client systems in the client-server environment 100. There may also be one or more clusters of data stored in one or more cloud storages or storage coupled to or near the server. Each of the clusters of data may be accessible by one or more clients. The ellipsis 116 represents that each client system may include one or more data storages. The ellipsis 122 represents that each client system may have access to one or more network storages for storing the client data.

The client data, may be referred to herein as either 'data,' one or more 'data cluster(s)' and/or one or more 'data set(s)'.

As mentioned previously, some data is stored in storage devices that are vulnerable to theft and/or corruption. For instance, a malicious insider (e.g., a janitor) can infect or remove a storage device from a client system. In another example, decommissioned storage devices (at the end of their life cycle) are sometimes discarded with sensitive data. These storage devices may be recycled, resold, or obtained by a malicious person.

Embodiments of the present invention can be used to help improve the security and protection of client data by encrypting the data (e.g., 104, 108, 112, 114, 116, 118, 120, or 122) and storing keys for accessing the data separately from the client. In some instances, the encrypted data is also associated with a unique ID. This unique ID may comprise data defining a date of creating, modifying or accessing the data. The unique ID can also be a randomly generated identifier. The client and server associate the unique ID with the cluster of data that is encrypted. The unique ID and the decryption key associated with the cluster of data are stored in a key ID database 126 that the server 124 has access to. The decryption key is not stored by the client (at least not in a format that can be used by the client). When a malicious person obtains access to the client storage device containing the encrypted data, they would not be able to obtain/use the decryption keys, because they are either maintained on the server and/or are stored in a format (encrypted format) that cannot be used without first accessing another key from the server. Thus, they would not be able to access the encrypted data.

One set of encryption/decryption key(s) may be used to encrypt a particular cluster of data. Each cluster of data may be classified in many different ways, including, but not limited to, classifying data based on a client's ID, a client's system's ID, a client's geographic location, a data storage's geographic location, a type of data, the sensitivity of the data.

There are also many ways to encrypt each cluster of data. Encryption is the process of converting ordinary information (plaintext) into unintelligible text (ciphertext). Decryption is the reverse, in other words, moving from the unintelligible ciphertext back to plaintext. A cipher is a pair of algorithms that create the encryption and the reversing decryption. The detailed operation of a cipher is controlled both by the algorithm and in each instance by a "key". The key is a secret (ideally known only to the communicants), usually a short string of characters, which is needed to decrypt the ciphertext. Ciphers may be used directly for encryption or decryption without additional procedures such as authentication or integrity checks. They also may be used to include sender/receiver identity authentication, digital signatures, interactive proofs and secure computation, among others.

There are two general kinds of cryptosystems: symmetric and asymmetric. In symmetric systems the same key is used to encrypt and decrypt a message. Data manipulation in symmetric systems is faster than asymmetric systems as they generally use shorter key lengths. Asymmetric systems use a public key to encrypt a message and a private key to decrypt it. Use of asymmetric systems enhances the security of communication. Examples of asymmetric systems include, but are not limited to, RSA (Rivest-Shamir-Adleman), and EEC (Elliptic Curve Cryptography). Symmetric models include, but are not limited to, the commonly used AES (Advanced Encryption Standard).

Symmetric key ciphers are implemented as either block ciphers or stream ciphers. A block cipher enciphers input in blocks of plaintext as opposed to individual characters. Stream ciphers, in contrast, create an arbitrarily long stream of key material, which is combined with the plaintext bit-by-bit or character-by-character, somewhat like the one-time pad. When symmetric algorithms are used, a same key is used for both encryption and decryption. Typically, in a symmetric cryptosystem, encryption keys are randomly generated. When asymmetric algorithms are used, different keys are used for encryption and decryption, such that a public key is used to encrypt the data, and a private key is used to decrypt the data.

The asymmetric cryptosystem is also called public key system. A public key system is so constructed that calculation of one key (the 'private key') is computationally infeasible from the other (the 'public key'), even though they are necessarily related. Instead, both keys are generated secretly, as an interrelated pair. In public-key cryptosystems, the public key may be freely distributed, while its paired private key must remain secret. In a public-key cryptosystem, the public key is used for encryption, while the private or secret key is used for decryption.

Cryptographic hash functions are a third type of cryptographic algorithm. They take a message of any length as input, and output a short, fixed length hash, which can be used (for example) as a digital signature or unique identifier. For good hash functions, an attacker cannot find two messages that produce the same hash.

Additionally, public-key cryptosystems may be hybrid cryptosystems, in which a symmetric-key encryption algorithm or an asymmetric-key encryption algorithm is used for the data itself, while the relevant symmetric key or private key is further encrypted using a public-key algorithm or a symmetric-key algorithm. Similarly, hybrid signature schemes may be used, in which a cryptographic hash function is computed as a unique identifier associated with a decryption key that is used to decrypt the data, or used to decrypt the encrypted decryption key. The client-server system may also include another layer further authenticating a user's identity via the client system, or via the server.

Various combinations of the foregoing symmetric, asymmetric and hash systems are utilized in the disclosed embodiments for improving the security and protection of client data.

Figure 2:
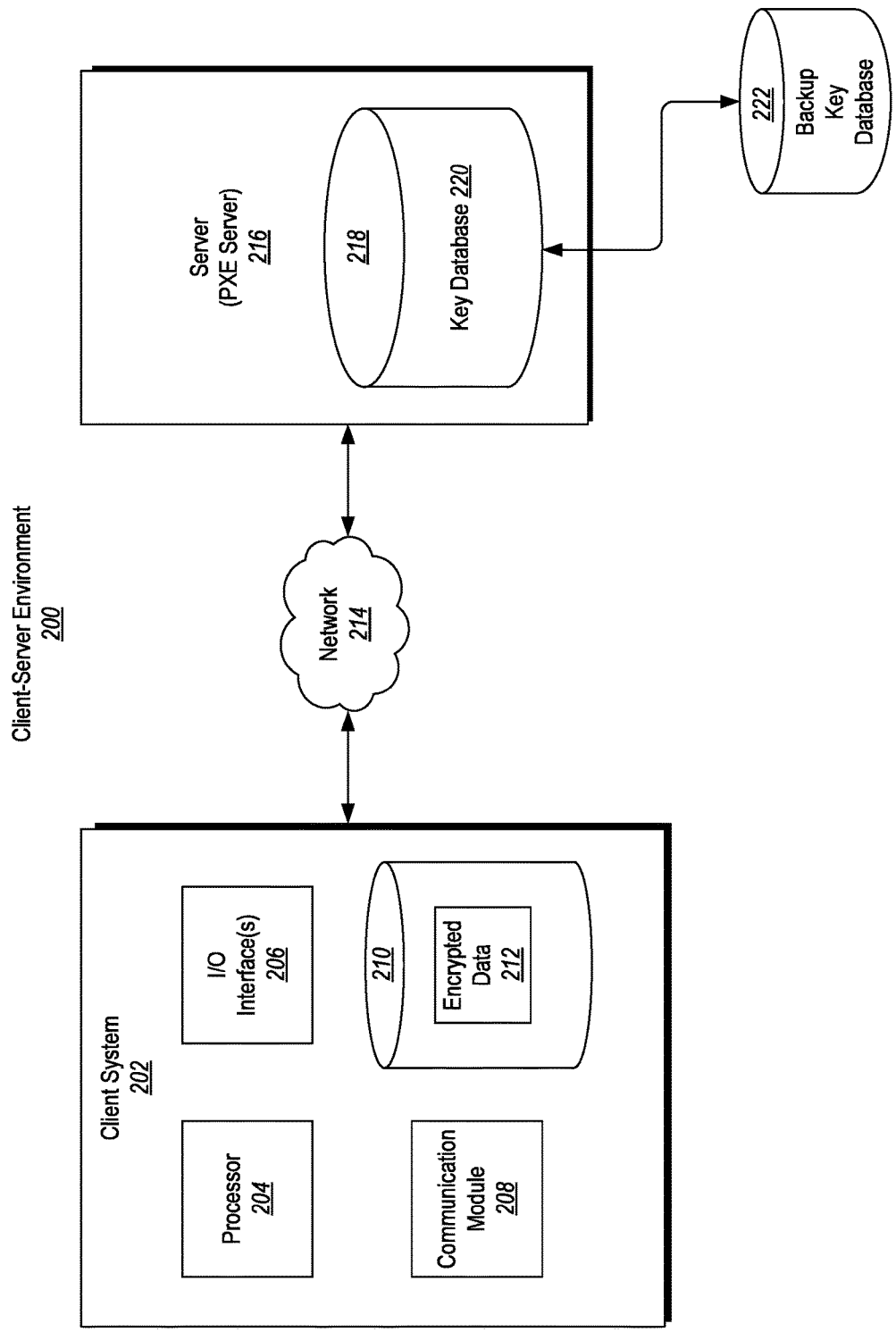
FIG. 2 illustrates the client-server environment of FIG. 1 in which the data server further backups the decryption key in a redundant storage.

FIG. 2 illustrates an example of a client-server system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, computer controlled robots and manufacturing machines, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 2, an exemplary system for implementing the invention includes a client system 202, which may be a general purpose computing device in the form of a personal computer 202 (similar to a client system from FIG. 1) and which may be configured to communicate with a server 216 (similar to the server of FIG. 1) over a network connection 214 (similar to the network connections of FIG. 1).

Components of the computer 202 may include, but are not limited to, one or more processors 204, a system memory 210, an input/output (I/O) interface 206, and a communication module 208. The I/O interface 206 may include but is not limited to a keyboard, a computer mouse, a touch screen, a monitor and printers. The communication module 208 may include but is not limited to modems, network cards, communication interfaces and so forth.

The system memory 210 stores the client data (often encrypted) and also includes computer storage media in the form of volatile and/or nonvolatile memory such as read only memory (ROM) and random access memory (RAM). A basic input/output system (BIOS), containing the basic routines that help to transfer information between elements within computer 210, such as during start-up, is typically stored in ROM. RAM typically contains data and/or program modules that are immediately accessible to and/or presently being operated on by the processors or processing unit 204.

The storage device 210 also includes computer-readable instructions for implemented the disclosed methods, corresponding data structures and other data for the client system 202.

A user may enter commands and information into the client system 202 through I/O interfaces 206, which may include input devices such as a touch screen, a microphone, a keyboard, a mouse, trackball and/or touch pad. Other input devices may include a joystick, game pad, satellite dish, scanner, motion sensors and the like. These and other input devices are often connected to the processing unit (including one or more processor 204) through a universal serial bus (USB).

The I/O interfaces 206 may also include output interfaces, such as a monitor or other type of display device, speakers, haptic feedback devices, and so forth.

In one embodiment, when a user of a client system 202 creates a cluster of data 212, the data 212 is encrypted using a predetermined cipher or key, and the encrypted data is then stored in storage 210. The decryption keys are sent to the server 216 to be stored in a key database 218 that the server has access to. In these embodiments, the client does not store the decryption keys. Alternatively, the client system 202 may further encrypt the decryption key (which is stored in an encrypted format at the client), then the decryption keys used to encrypt the decryption keys are sent to the server 216 to be stored in the key database 220, such that the decryption key at the client is inaccessible without first obtaining the decryption key from the server for decrypting the encrypted decryption key at the client.

The storage 210 may be a local storage that is included in the client system 202. The storage may also be a remote and/or distributed network storage that the client system 202 is able to access, as described above with respect to FIG. 1. The key database 220 may be stored in an internal storage 218 of the server 216. The key database 220 may also be stored in an external storage device accessible to the server, 216 or a network storage that the server has access through network connections (not shown in the Figure).

The key database 220 may also be backed up in a redundant storage 222. The redundant storage 222 may be a local storage that is only accessible to the server. Alternatively, it may be a network storage that is accessible to one or more servers.

Figure 3:
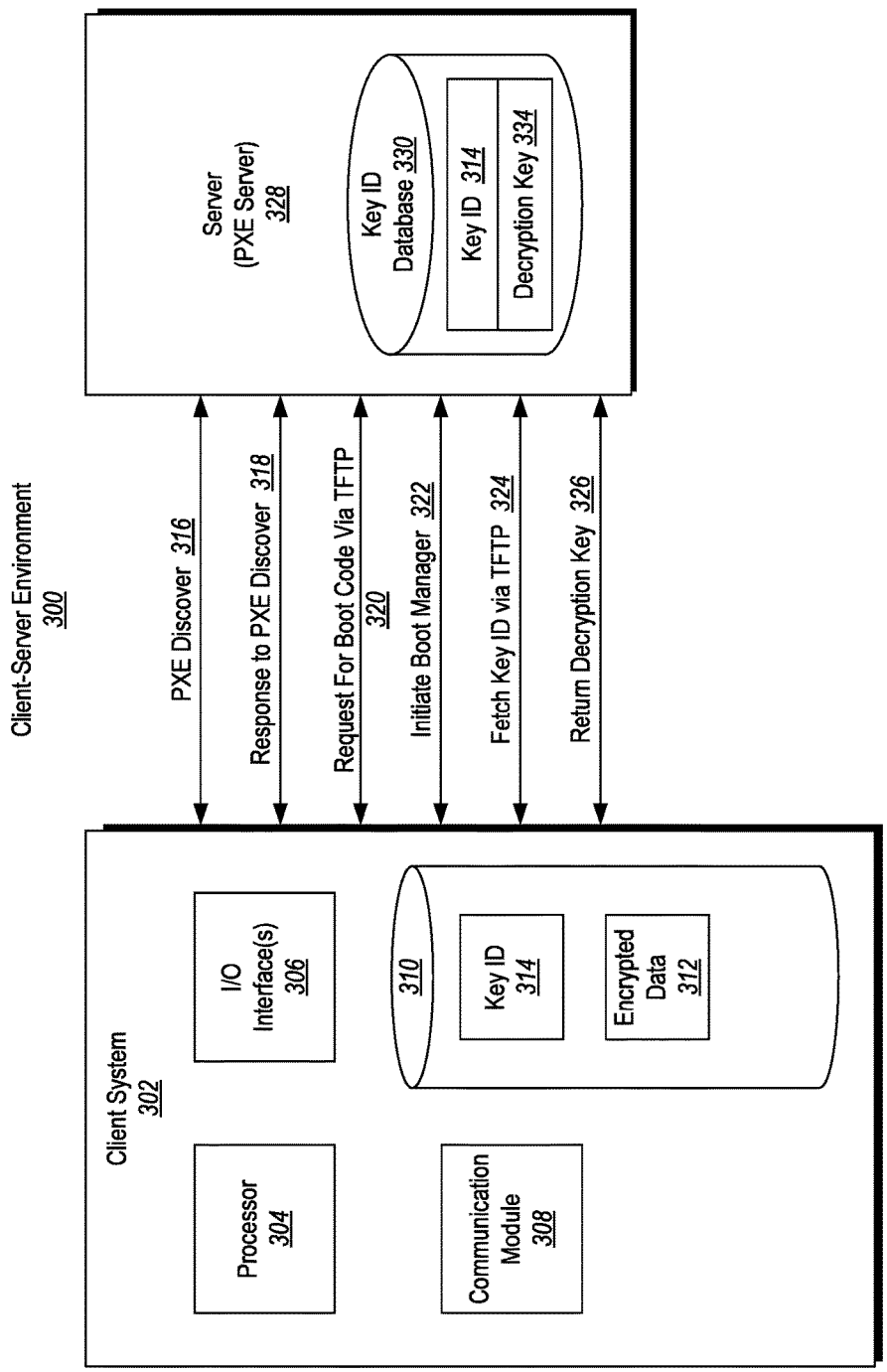
FIG. 3 illustrates one embodiment of a client-server environment, in which each cluster of encrypted data is associated with a key identifier (ID), and the key ID and the decryption key are stored in a server accessible key ID database.

FIG. 3 illustrates one embodiment of a client-server environment 300, in which each cluster of encrypted data 312 is associated with a separate key identifier (ID) 314. The key ID 314 and a corresponding decryption key 334, which is configured for decrypting the encrypted data 312, are stored in a key ID database 330 that the server 328 has access.

In some embodiments, the server 328 is a Preboot Execution Environment (PXE) server. In modern data centers, for example, PXE servers are a common choice for operating system booting, installation and deployment. The PXE is a standardized client-server environment that boots a software assembly, retrieved from a network, on PXE-enabled client systems. On the client system side it requires a PXE-capable network interface controller (MC), and uses a set of industry-standard network protocols such as Trivial File Transfer Protocol (TFTP).

TFTP is a lockstep file transfer protocol which allows a client to get a file from or put a file onto a remote host. One of its primary uses is in the early stages of nodes booting from a local area network. In TFTP, a transfer is initiated by the client issuing a request to read or write a particular file on the server. The request can optionally include a set of negotiated transfer parameters proposed by the client system. If the server grants the request, the file is sent by default or the number specified in the blocksize negotiated option. Both devices (client and server) involved in a transfer may be considered senders and receivers. For instance, one system sends data and receives acknowledgments, the other system also sends acknowledgements and receives data.

The initiating client system may send a service request to a server. The server replies with an acknowledgement. The client system sends data packets to the server, and the destination server replies with acknowledge packets for data packets. Even though TFTP normally may not include login or access control mechanisms, some disclosed embodiments include layering authentication, access control, confidentiality, and/or integrity checking above or below the layer at which TFTP runs.

In some instances, the PXE boot of a client system boot is initiated when a client sends a general request to a PXE server, i.e. a PXE discover request (316). The PXE server responds to the PXE discover with an acknowledgement (318). Then the client system sends a request for boot code via TFTP (320). In response to the request for boot code, the server initiates a boot manager including boot code (322), which may include the client system downloading the boot code using TFTP from the server to the client system's RAM. Then the boot manager is executed at the client to fetch the unique key ID (324). Finally, after the server receives and matches the unique key ID to a corresponding decryption key 334 at the server, the server provides the decryption key to the client (326).

Figure 4:
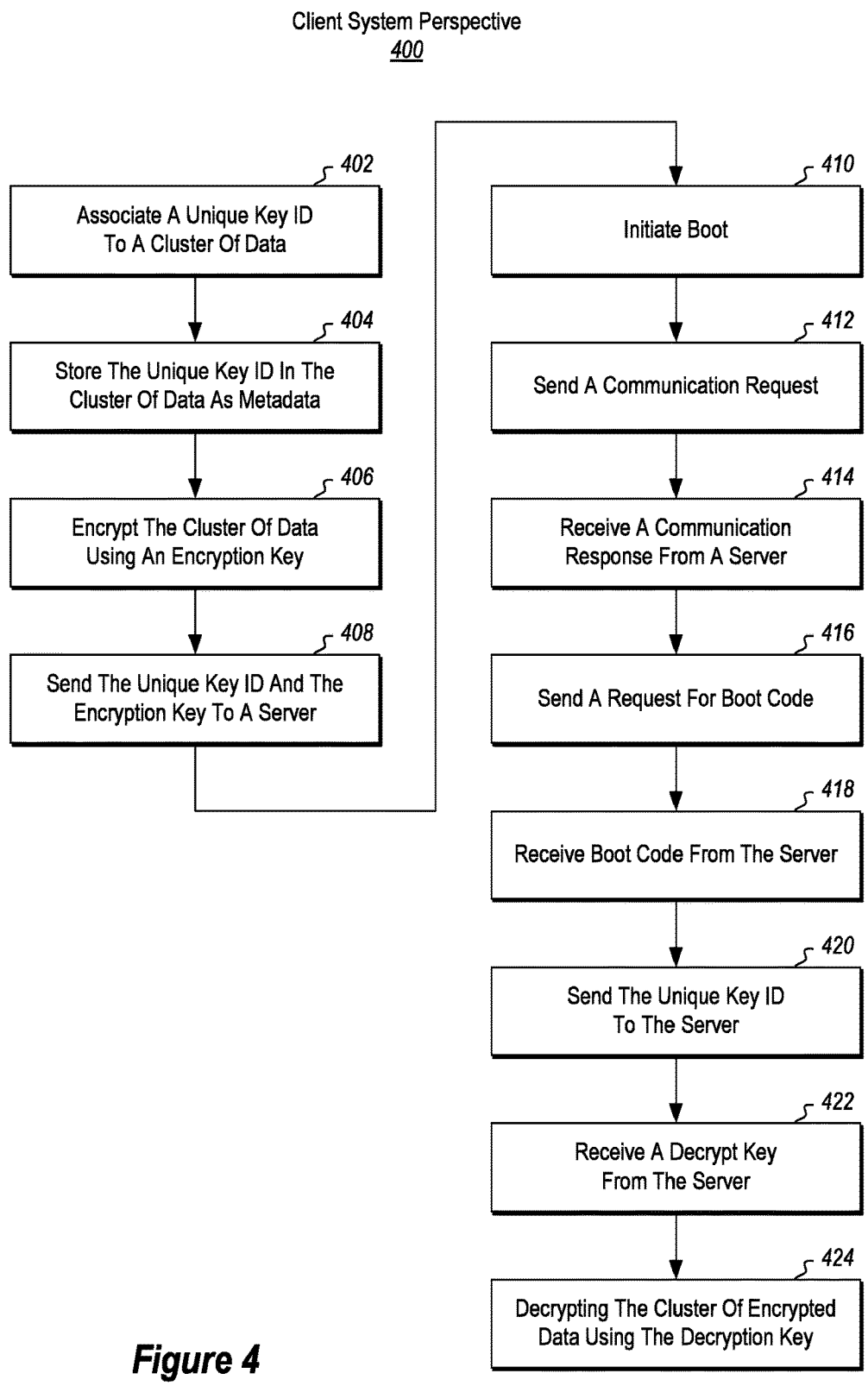
FIG. 4 illustrates the client system perspective of the client-server environment shown in FIG. 3.
Figure 5:
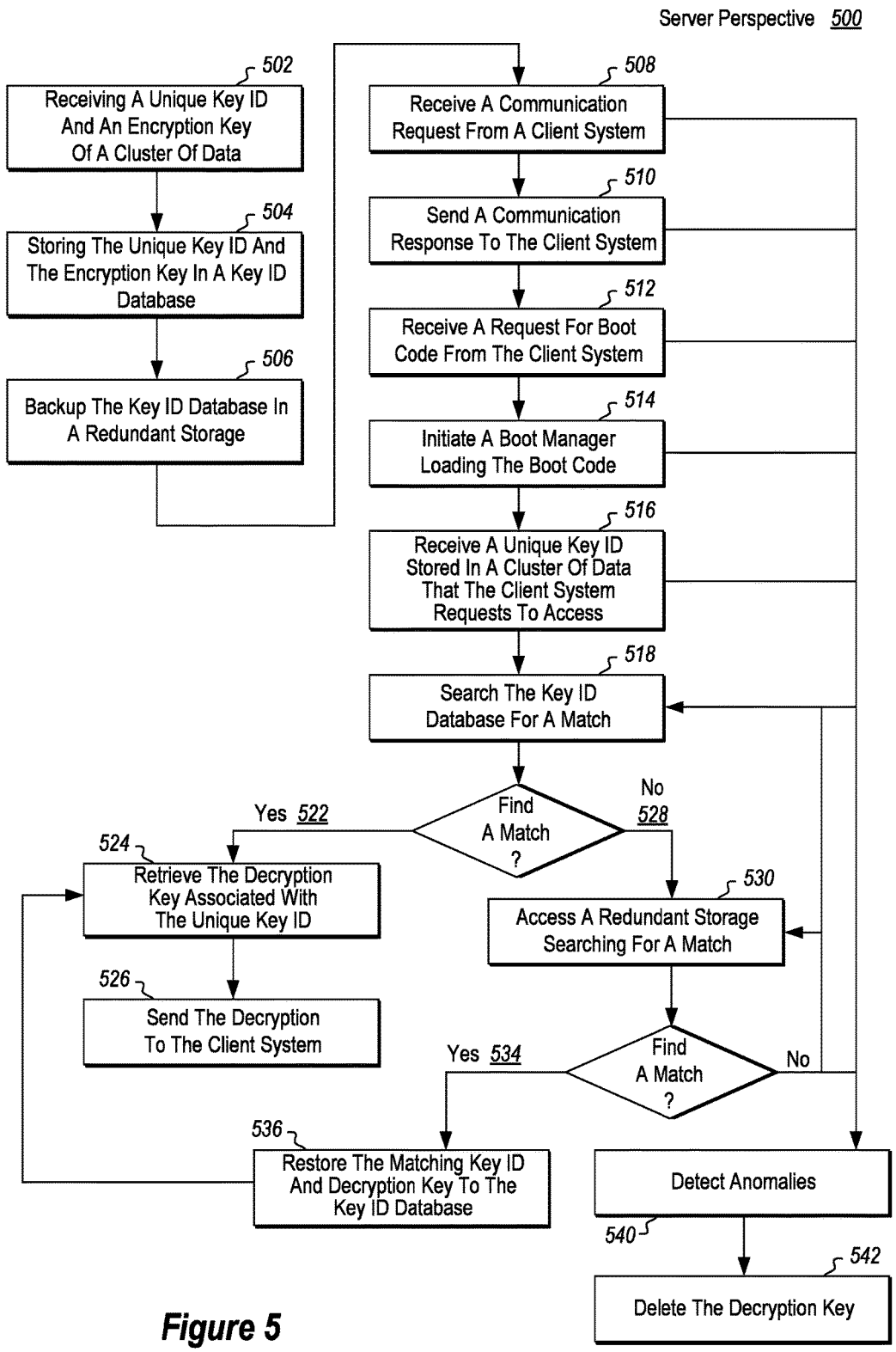
FIG. 5 illustrates the server perspective of the client-server environment shown in FIG. 3.

Attention will now be directed to FIGS. 4 and 5, which illustrate corresponding methods for helping to keep encrypted client data tamper resistant, as presented from the client perspective (FIG. 4) and the server perspective (FIG. 5), and such as may be implemented by client 302 in the client-server environment 300 of FIG. 3.

When a user of a client system 302 creates a cluster of data to be protected, the client system associates the cluster of data with a unique key ID (act 402), and stores the unique key ID in the cluster of data as metadata (act 404). The client system then encrypts the cluster of data using a predetermined cipher (act 406). The cryptosystem used for encrypting the data may be a symmetric system or an asymmetric system. When a symmetric system is used, the encryption key is the same as the decryption key, i.e. a symmetric key. When an asymmetric system is used, there will be a pair of different keys used to encrypt or decrypt the data. The key used to encrypt the data is usually distributed freely and called public key. The key used to decrypt the data is kept secret and called private key.

After encryption, the client system sends the unique key ID and the decryption key to the server for storage (act 408). The server 328 receives the key ID and the decryption key from the client system 302 (act 502) and stores it in a key ID database (act 504). The server 328 may also backup the key ID database in a redundant storage (act 506).

When a client system 302 needs to access the encrypted data, it initiates a system boot process (act 410), and sends a communication request to the server (act 412). The serve 328 receives the communication request from the client system 302 (act 508), and sends a communication response to the client system 302 as an acknowledgement (act 510).

Next, the client system 302 receives the communication response from the server 328 (act 414) and sends a request for boot code (act 416). The server 328 receives the request for boot code from the client system 302 (act 512) and initiates a boot manager (act 514). The boot code is received by and/or executed at the client system (act 418). When executed, the boot code reads the unique key ID associated with the encrypted data at the client system and sends the unique key ID to the server 328 (act 420).

When the server 302 receives the unique key ID (act 516), it searches the key ID database for a match (act 518). Upon finding a matching unique key ID (act 522), the server retrieves the decryption key associated with the matching unique key ID (act 524) and sends the decryption key to the client system 302 (act 526). Responsively, the client system 302 receives the decryption key from the server 328 (act 422), and decrypts the cluster of data using the decryption key (act 424).

If no match is found (act 528), the server 328 reaches out to a remote/redundant storage searching for a match (act 530). Then, if a match is found at the remote/redundant storage (act 534), the server obtains/restores the matching key ID and stores the decryption key in the key ID database (act 536). This can be beneficial when a key is inadvertently lost/inaccessible by the server. For instance, in some embodiments, there may be times when a key ID and/or its associated key(s) are erroneously deleted or corrupted and/or the server storage component that is storing the key ID crashes. In such circumstances, the servers may access the backup key ID database and retrieve the missing key ID and its key(s) and restore them back to the key ID database.

To facilitate the foregoing, some embodiments utilize a remote key ID database, separately from the server(s). There may also be many backup key ID databases stored in different redundant storages that are accessible by the server(s). Each of the servers may communicate with a client system separately. Or each of the servers may have access to an identical key ID database that is coupled to the server for faster communication. In such a case, when one server updates its key id database, the rest of the servers also updates the key id database accordingly. Each server's database may also be deemed as a redundant key ID storage for the other servers.

The disclosed embodiments also provide techniques for addressing anomalies. For instance, during each step of the communication protocol, described above, the server 328 may detect asset management anomalies (act 540). In response certain anomalies, the server may delete a key ID and/or its associated decryption key (act 542). For example, an anomaly may be detected/determined in response to the boot manager failing to successfully read the key associated with the unique key ID due to, for example, a storage device that is marked missing or decommissioned. In another example, there may be a threshold number of failed attempts to access a cluster of encrypted data, such that no matching key ID can be found from the key ID database and/or the backup storage. This would also trigger the determination/detection of an anomaly.

With specific regard to the methods described in reference to FIGS. 3-5, the client's data is encrypted, no matter whether the data are stored locally or on a cloud storage, and the decryption key is stored separately (i.e., not stored locally with the cluster of data or in the client's system). Accordingly, even if a malicious person accesses a storage device or a computer containing the encrypted data, the data is inaccessible, because the decryption key is stored on a remote server and not ascertainable by the malicious person.

However, utilizing the protocols/methods described above, it is possible that a hacker could sniff out the data being transmitted back and forth between a client system and a server. Accordingly, to add another layer of security, some disclosed embodiments include further encrypting the decryption key by a random local key, sending the encrypted decryption key to the server, and storing the random local key in the cluster of encrypted data as metadata. This way, when a client system needs to access a cluster of encrypted data, the server will send out the encrypted decryption key, and after receiving the encrypted decryption key, the client system decrypts the encrypted decryption key using the random local key, then decrypt the cluster of data using the decrypted decryption key. In this case, a hacker may attempt to obtain an encrypted decryption key via hacking the network, which alone would not allow him to access the key or the encrypted data.

Figure 6:
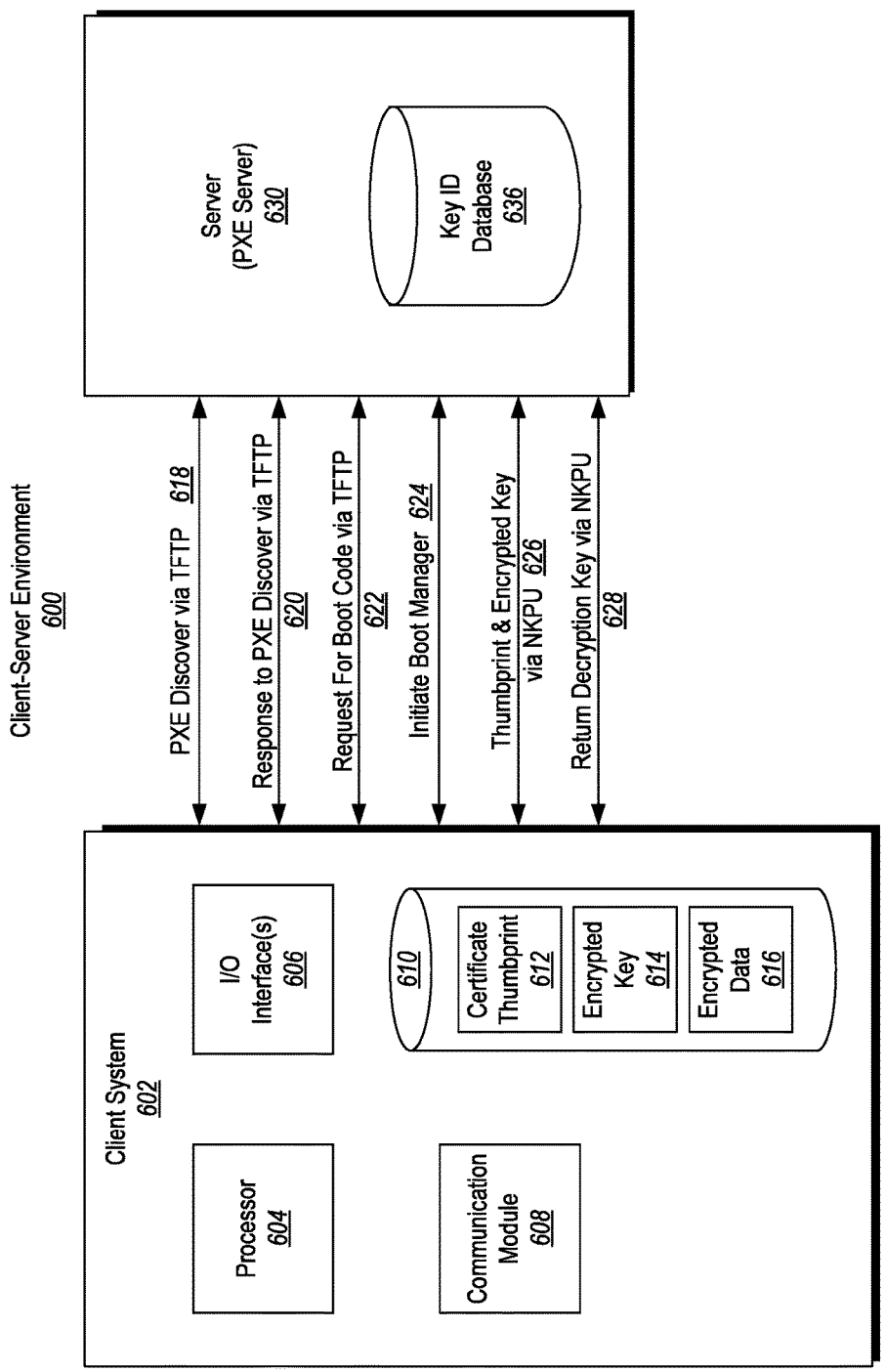
FIG. 6 illustrates another embodiment of a client-server environment, in which the decryption key is further encrypted via an asymmetric key.
Figure 7:
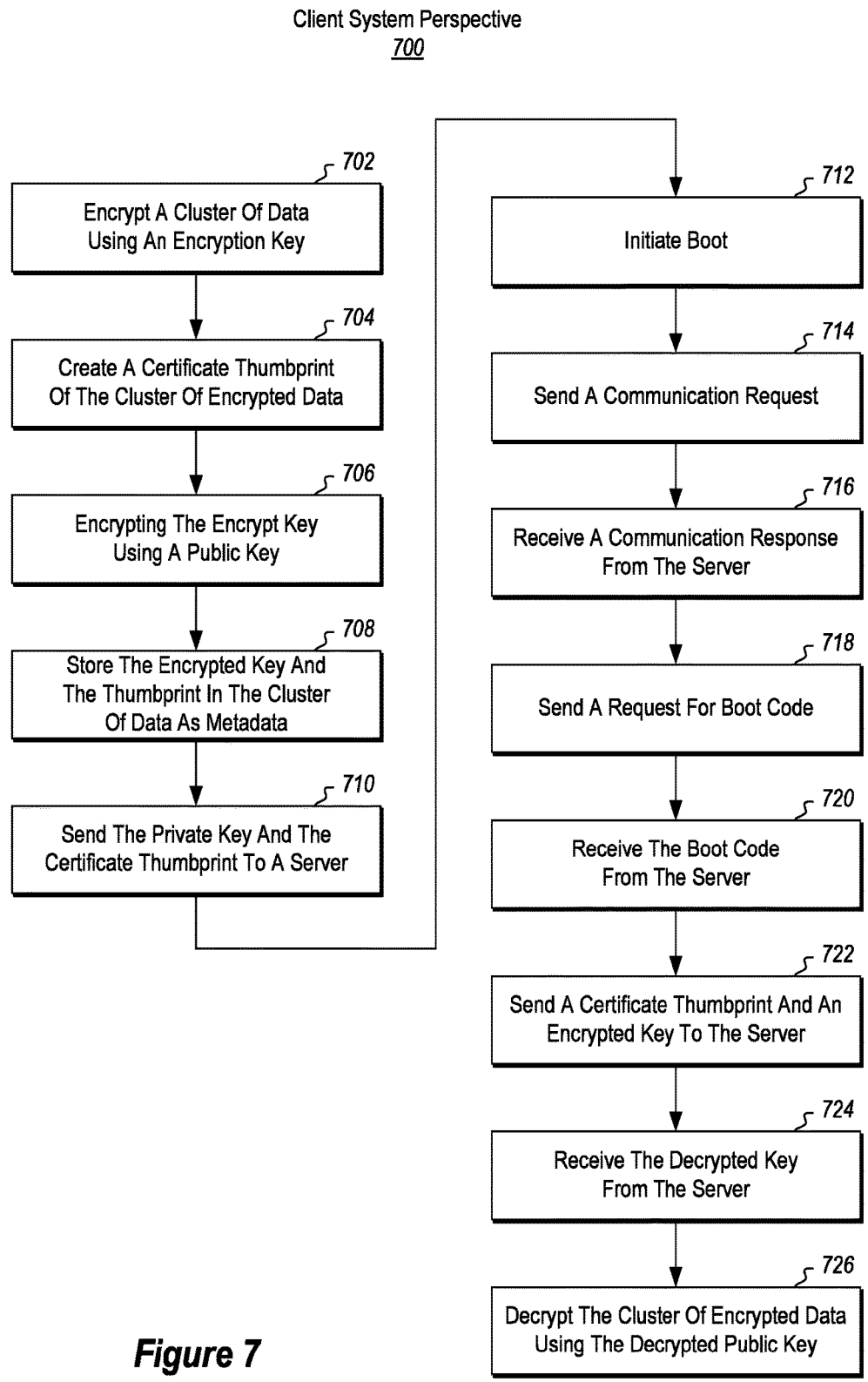
FIG. 7 illustrates the client system perspective of the client-server environment shown in FIG. 6.
Figure 8:
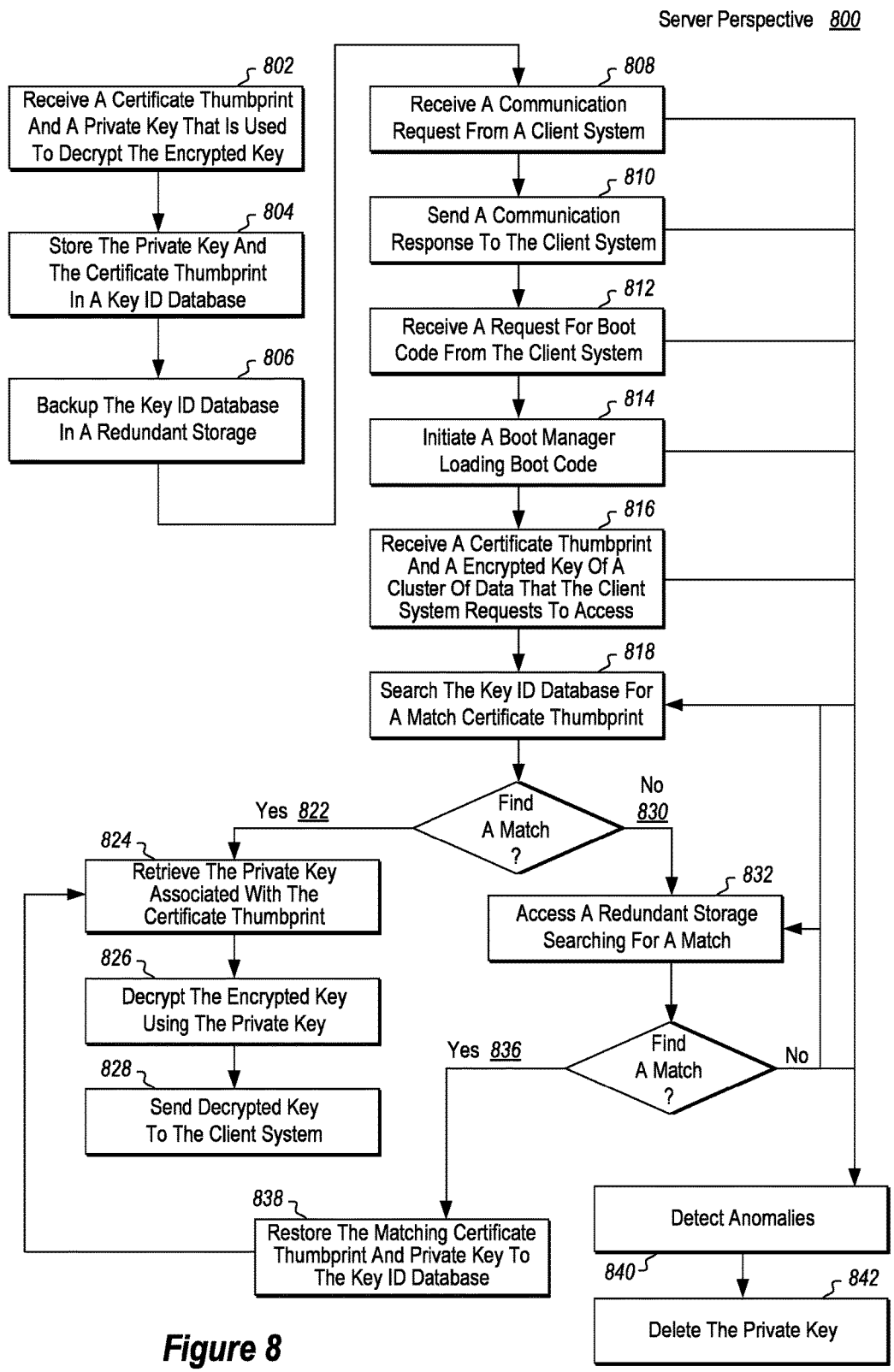
FIG. 8 illustrates the server perspective of the client-server environment shown in FIG. 6.

Attention will now be directed to FIGS. 6-8, which illustrate additional/alternative systems and methods for helping to keep encrypted client data tamper resistant, as presented from the client perspective (FIG. 7) and the server perspective (FIG. 8), and such as may be implemented by a client 602 in a client-server environment 600 of FIG. 6.

As illustrated in FIG. 6, a client system 602 is similar to the client system 302 of FIG. 3, including at least a processor 604, a communication module 608, an I/O interface 606 and storage device 610 that stores a certificate/thumbprint 612, an encrypted decryption key 614 and encrypted data 616 that the encrypted decryption key (614, once decrypted) is configured to decrypt. The server 630 stores or has access to a key ID database 636 that stores the decryption key for decrypting the encrypted decryption key.

Similar to the server 328 in FIG. 3, server 630 may also be a PXE server. In this environment, the client sends an initial discover request (618) that triggers a server response (620). Then, the client sends a request for boot code (622) that triggers the initiation of the boot manager (624). The client then sends a thumbprint and the encrypted decryption key to the server (626). After the server decrypts the encrypted decryption key (with a key at or accessible to the server) the server sends back the matching decryption key (628).

In this embodiment, the unique key identifier of the encrypted data may be a certificate thumbprint 612. A certificate thumbprint 612 is a string that uniquely identifies a cluster of data. A thumbprint may be a hash that is calculated from the content of the cluster of data using a thumbprint algorithm. The hash may be based off of any combination of the encrypted data, the encryption key, the unique ID, a client identifier and/or any other information stored at or associated with the client system. Each cluster of encrypted data is separately identified via a unique certificate thumbprint. In some instances, all data at the client is combined into a single cluster. In other embodiments, the client stores separate clusters of data that are each associated with a different unique ID and/or thumbprint.

In some embodiments, as referenced in FIGS. 7 and 8, the client system 602 encrypts the data using a pre-determined cryptography (act 702) and creates a certificate thumbprint of the cluster of the encrypted data (act 704). The client also encrypts the decryption key via an asymmetric cryptosystem (act 706). As explained above, in an asymmetric cryptosystem, there is a pair of different keys generated. A public key is used to encrypt the data, and a private key is used to decrypt the data. Here, the decryption key is further encrypted by a public key, and the private key interrelated to the public key is used to decrypt the encrypted decryption key.

The client system 602 then stores the encrypted decryption key and the certificate thumbprint in the cluster of encrypted data as metadata (act 708). The client then sends the certificate thumbprint and the private key that paired with the public key to a server 630 (act 710).

The server 630 receives the certificate thumbprint and the private key (act 802), and stores them in a key ID database (act 804). One difference between this embodiment, compared to the previous one (FIGS. 3-5), is that the server does not store the decryption key that is used to decrypt the cluster of data, but a private key (stored in the Key ID database, or that is otherwise accessible to the server) that is used to decrypt the encrypted decryption key (which is stored at the client).

In some embodiments, the server creates/stores a backup of the private key (which is stored in the server key ID database) in a redundant/remote storage (act 806).

Also, in some instances, since the boot manager repeatedly sends and receives the private keys and encrypted/decrypted decryption keys, it may use a different protocol than was previously used in FIGS. 3-6.

One of the protocols the boot manager may use is Network Key Protector Unlock Protocol (NKPU). NKPU enables a client system to send key material along with a session key as an encrypted package to a server and to receive the decrypted key material protected by the session key. A session key is a short-lived symmetric key used to encrypt or authenticate data sent in the NKPU protocol. For example, when the private key or encrypted/decrypted decryption keys are communicated between the client system and the server, NKPU protocol would further protect these keys with a session key. Therefore, even a successful hacker could only obtain an encrypted private key or encrypted decryption keys that are encrypted by a session key, which is insufficient to provide access to data.

When a client system 602 needs to access a cluster of data, the client system 602 initiates a boot process (act 712), and sends a communication request to the server (act 712). The server 630 receives the communication request from the client system 602 (act 808) and sends a communication response to the client system 602 (act 810). The client system 602 receives the communication response from the server (act 716) and sends a request for boot code (act 718).

The server 630 receives the request for boot code from the client system (act 812) and initiates a boot manager loading boot code (act 814). The client system 602 receives the boot code from the server 630 (act 720) and sends a certificate and the encrypted key to the server 630 (act 722). The server 630 receives the certificate thumbprint and the encrypted key of the cluster of data that the client system 602 requested to access (act 816) and searches the key ID database for a matching certificate thumbprint (act 818).

When the server 630 finds a matching certificate thumbprint (act 822), it retrieves the private key that is associated with the certificate thumbprint (act 824), and decrypts the encrypted key (act 826), and send the decrypted key back to the client system (act 828). The client system receives the decrypted key from the server (act 724) and decrypts the cluster of data using the decrypted key (act 726).

If no match is found between the certificate thumbprint and a key in the Key ID database (act 830), the server 630 reaches out to a remote/redundant storage searching for a match (act 832). Then, if a match is found in the remote/redundant storage (act 836), the server 630 obtains/stores/restores the matching certificate thumbprint and the private key to the key ID database (act 838).

During each step of this process, the server may detect asset management anomalies (act 840), as previously described in reference to FIG. 5. Accordingly, in response to detecting anomalies, the server may delete a certificate thumbprint and the key associated with it (act 842).

As described before, there may be many servers that have access to a key ID database. There may also be many backup key ID databases stored in different redundant storages.

In this embodiment, since the decryption key is further encrypted, it can help solve both the malicious insider and snooping hacker problems. As mentioned earlier, in an asymmetric cryptography system, when a key-pair is created, the private key is kept privately and the public key can be accessed by anyone to send the key creator an encrypted message. Accordingly, an additional benefit of this embodiment is that the client system does not have to be in the network communicating with the server when the data is created and encrypted, because in an asymmetric cryptography system, the public key may have been distributed to the client system before the encryption of the cluster of the data, and the client system only needs the public key to encrypt the data.

Figure 9:
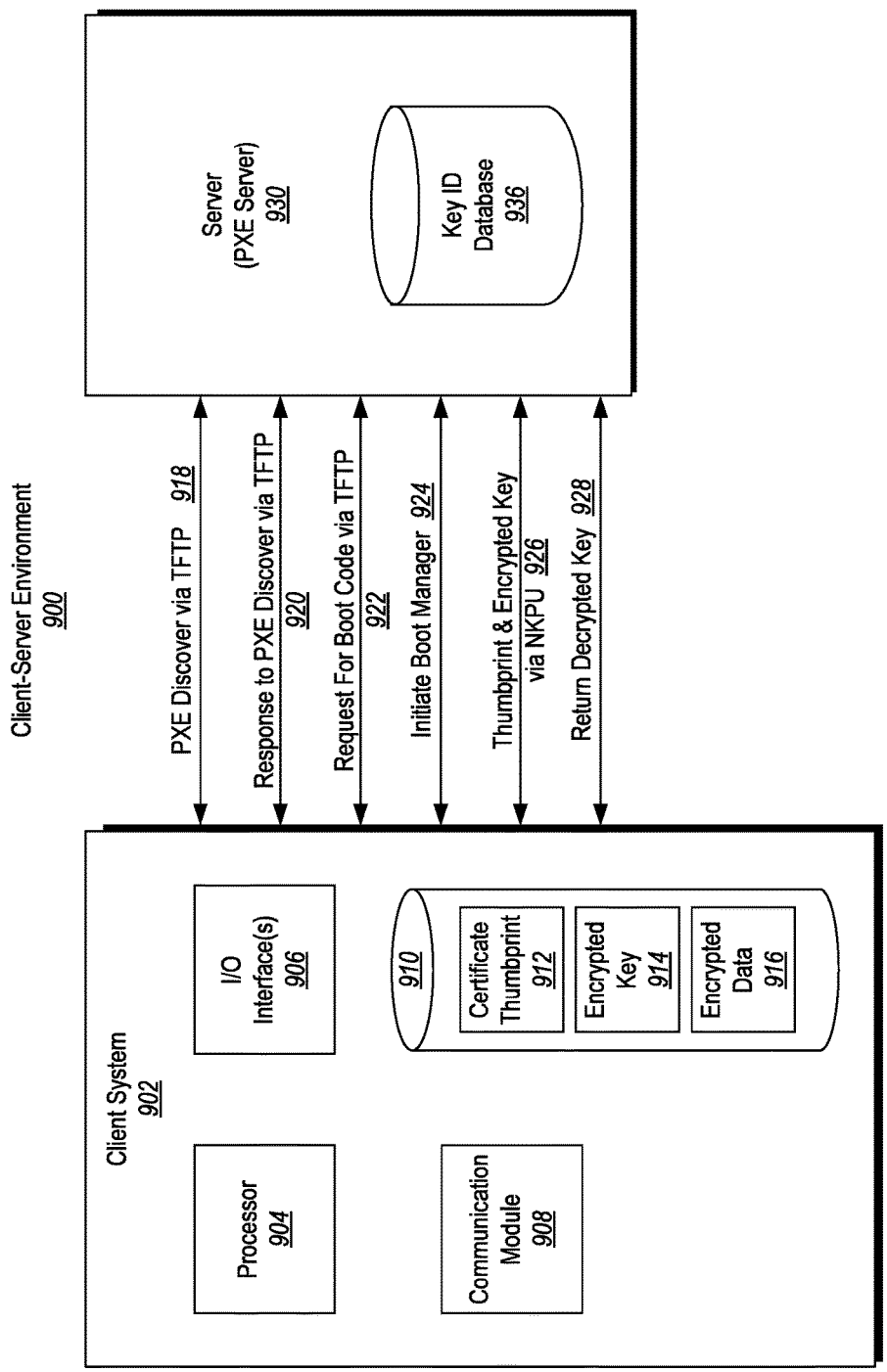
FIG. 9 illustrates another embodiment of a client-server environment, in which the decryption key is further encrypted via a symmetric cryptosystem.
Figure 10:
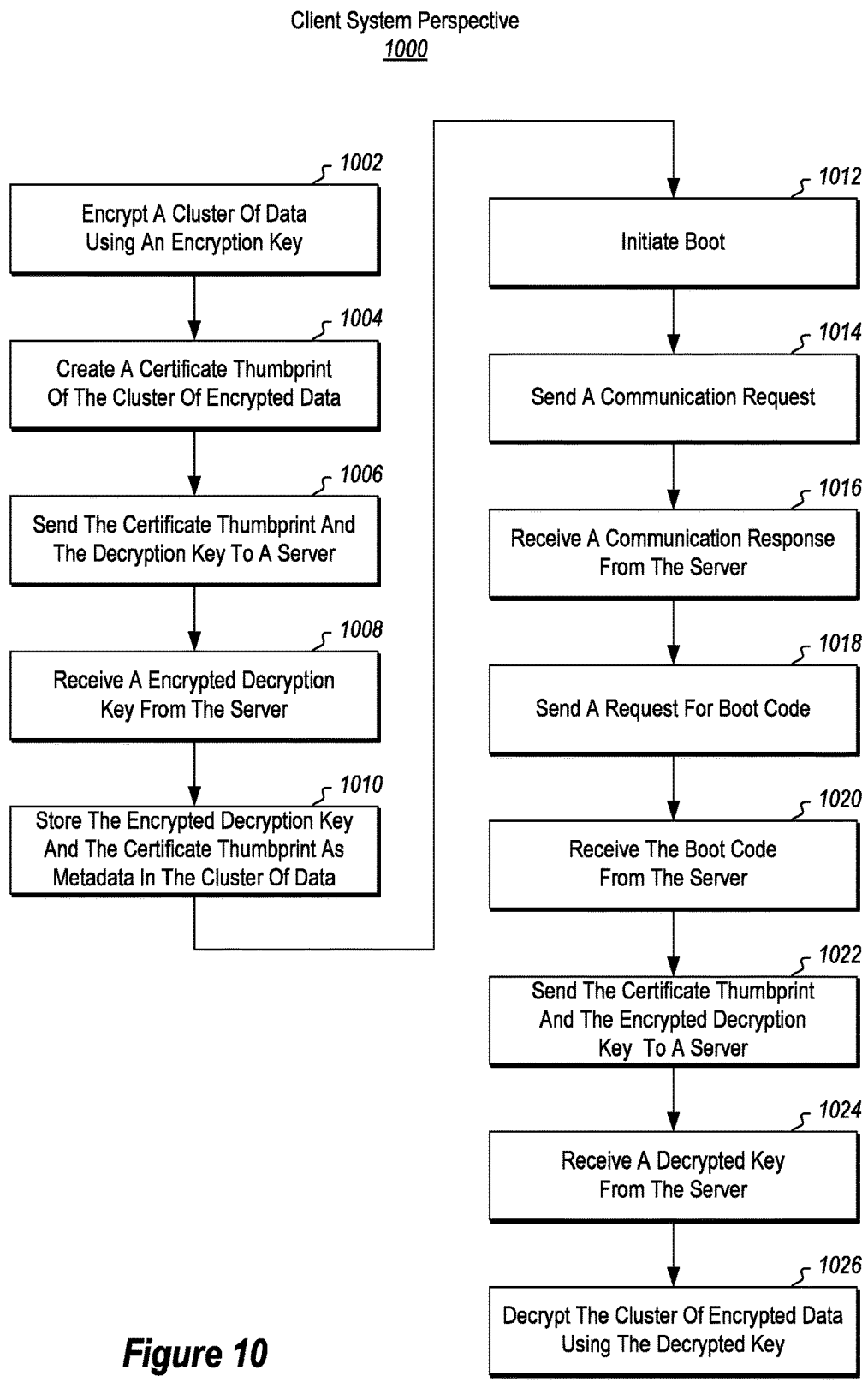
FIG. 10 illustrates the client system perspective of the client-server environment shown in FIG. 9.
Figure 11:
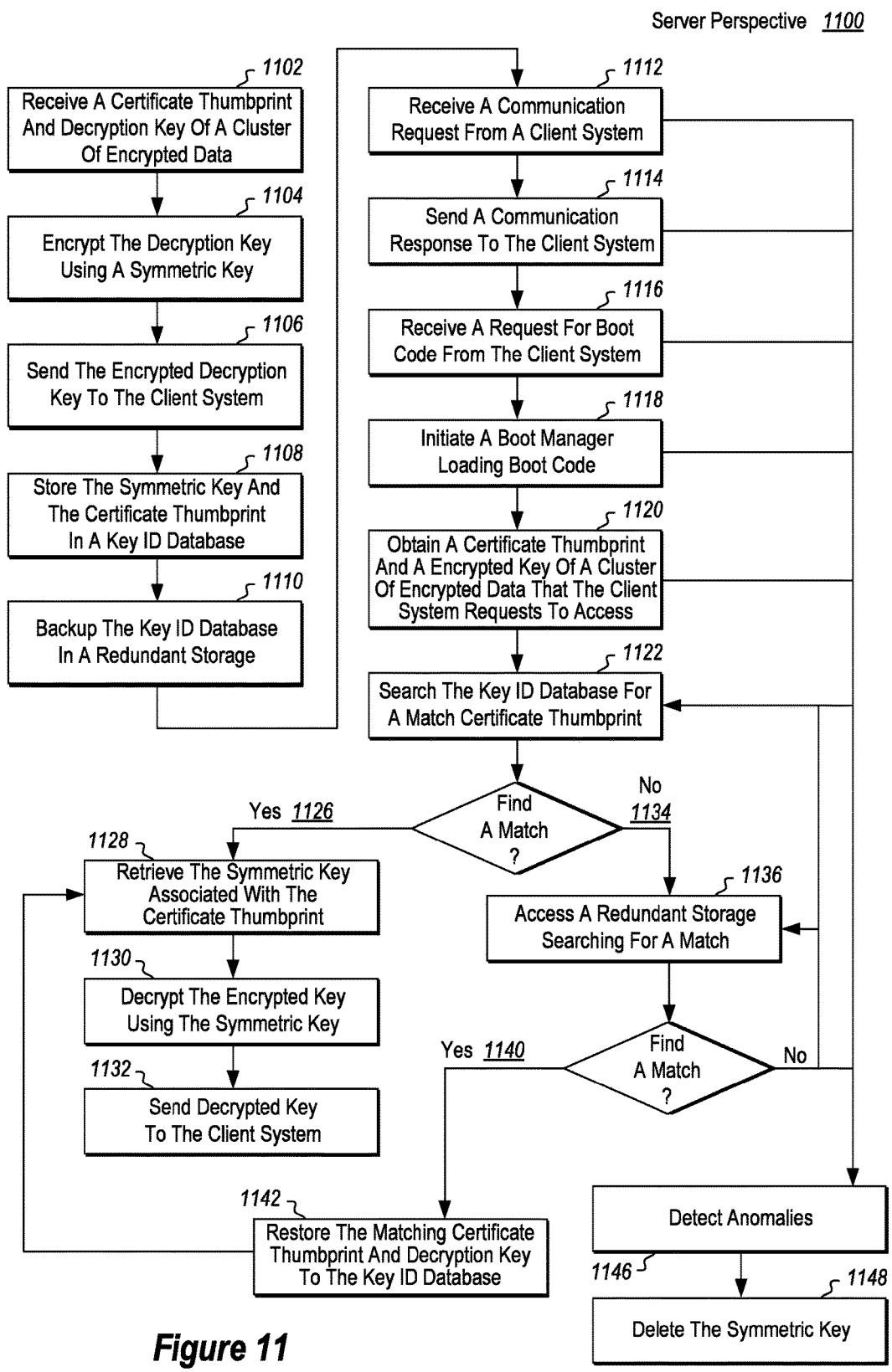
FIG. 11 illustrates the server perspective of the client-server environment shown in FIG. 9.

FIGS. 9-11 illustrate other embodiments for providing tamper protection to client data. In these embodiments, a client system 902 communicates with a server 930 in a client-server environment 900. In this embodiment, the unique key ID of each cluster of encrypted data may comprise a certificate thumbprint. However, unlike the embodiment illustrated in FIGS. 6-8, the decryption key is further encrypted via a symmetric cryptosystem. FIG. 10 illustrates a flowchart 1000 that describes a method implemented from the client system perspective. FIG. 11 illustrates a flowchart 1100 that describes the method implemented from the server system perspective.

As shown in FIG. 9, the client system 902 is similar to the client system 302 of FIG. 3, including at least a processor 904, a communication module 908, I/O interface(s) 906 and a storage device 910 that stores a certificate/thumbprint 912, an encrypted decryption key 914 and encrypted data 916 that the encrypted decryption key (914, once decrypted) is configured to decrypt. The server 930 stores or has access to a key ID database 936 that stores the decryption key for decrypting the encrypted decryption key.

Similar to the server 328 in FIG. 3, server 930 may be a PXE server. In this environment, the client sends an initial discover request (918) that triggers a server response (920). Then, the client sends a request for boot code (922) that triggers the initiation of the boot manager (924). The client then sends a thumbprint and the encrypted decryption key to the server (926). After the server decrypts the encrypted decryption key (with a key at or accessible to the server) the server sends back the matching decryption key (928).

This embodiment is similar to the previous embodiment (described in FIGS. 6-8). However, rather than using asymmetric keys, this embodiment uses symmetric keys. A symmetric key used to encrypt the decryption key is normally generated randomly by the server. And the server encrypts the decryption key and sends the encrypted decryption key back to the client system. The benefit of using a symmetric cryptosystem is that it requires less computation, therefore, the encryption and decryption would take less time and computing power. However, since a symmetric key is randomly generated by a server, and the server encrypts the decryption key initially (rather than the client). Accordingly, the client system and the server system must be in communication when the encryption takes place, i.e. the client system must be connected to the network for communicating with the server when the data is encrypted.

Now, with respect to FIGS. 10-11, it is noted that when a user of a client system creates a cluster of data, the client system 902 encrypts the cluster of data (act 1002) and generates a certificate thumbprint of the cluster of encrypted data (act 1004). The client system 902 sends the certificate thumbprint) and the decryption key to the server 930 (act 1006).

The server 930 receives the certificate thumbprint and decryption key of the cluster of encrypted data from the client system 902 (act 1102) and encrypts the decryption key with a randomly generated symmetric key (act 1104). The server sends the encrypted decryption key back to the client system 902 (act 1006), which is received by the client system 902 (act 1008) and stored with the certificate thumbprint and the cluster of encrypted data, as metadata (act 1010). Meanwhile, the server 930 stores the certificate thumbprint and the symmetric key in the key ID database (act 1108).

In some instances, the server 930 may also backup the key ID data in a remote/redundant storage (act 1110).

When a client system 902 needs to access a cluster of encrypted data, it initiates a boot process (act 1012), and sends a communication request to the server (act 1014). The server 930 receives the communication request (act 1112) and sends a communication response to the client system (act 1114). The client system 902 receives the communication response from the server 930 (act 1016) and sends a request for boot code (act 1018).

The server 930 receives a request for boot code (act 1116) and initiates a boot manager loading the boot code (act 1118). The client system 902 receives boot code from the server 930 as the boot manager executes (act 1020) and sends the certificate thumbprint and the encrypted decryption key to the server 930 through the boot manager (act 1022).

The server 930 receives the certificate thumbprint and the encrypted decryption key from the client system 902 (act 1020) and searches the key ID database for a matching certificate thumbprint (act 1122).

When a match is found (act 1126), the server 930 retrieves the symmetric key associated with the certificate thumbprint (act 1128) and uses the symmetric key to decrypt the encrypted key (act 1130). Then, the server 930 sends the decrypted key back to the client system 902 (act 1132). When the client receives the decrypted key from the server 930 (act 1024), it decrypts the cluster of encrypted data using the decrypted key (act 1026).

If no match is found in the key ID database for a matching certificate thumbprint (act 1134), the server 930 reaches out to a remote/redundant storage, searching for a match (act 1136). Then, if a match is found in the remote/redundant storage (act 1140), the server 902 stores/restores the matching certificate thumbprint and the key used to encrypt the symmetric key back to the key ID database (act 1142).

Similar to FIGS. 5 and 8, during each step of the process, the server may detect asset management anomalies (act 1146). In response to certain anomalies, the server may delete a key ID and/or its associated encryption and/or decryption key (act 1148).

Similar to the previous embodiments, in this embodiment, since the decryption key is also further encrypted, it also solves both the malicious insider and network hacker problems. Theoretically, one benefit of this embodiment over the previous embodiment is that this embodiment may operate faster than the previous embodiment if the hardware's computation powers are the same, because a symmetric crypto algorithm generally requires less computing than an asymmetric crypto algorithm. For example, when a data center with a significant number of servers needs to reboot after a power outage, the data encrypted using a symmetric cryptosystem may be ready to be accessed faster than the data encrypted using an asymmetric cryptosystem, and less server processing time is required to support this.

In all the embodiments described in this disclosure, the server may assign a different cluster of data a different key based on a predetermined classification, including but not limited to geographic locations of the data, the user IDs, and the type of the data.

Also, in all the embodiments described in this disclosure, the cryptosystem used to encrypt the clusters of data may be a symmetric cryptosystem or an asymmetric cryptosystem. For faster computation, a symmetric cryptosystem may be preferred. For heightened security protection, an asymmetric cryptosystem may be preferred.

Furthermore, additional authentications may be implemented as an additional layer before or after each of the disclosed embodiments to achieve an even higher level of security. Additional authentications may include but are not limited to requiring the server to trigger an approval request via Short Message Service (SMS), email, etc. based on configurable policy or metadata that is tied to the key ID.

Also, in all the embodiments described in this disclosure, the unique key IDs may be randomly generated, and/or may include certificate thumbprint. The unique key IDs may also be generated using any digital certification or signature function that is capable of generating a unique certification or signature.

Further, in all the embodiments described in this disclosure, sending and fetching the unique key ID and/or encrypted decryption key between a client system and a server may be achieved via different implementations, including but not limited to a boot manager initiated at the server, and/or boot code embedded in the BIOS or other firmware of the client system.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A client computing system for keeping encrypted data tamper resistant, comprising:
    one or more processors; and
    one or more storage media having stored computer-executable instructions that are executable by the one or more processors for implementing a method for keeping encrypted data tamper resistant, the method comprising:
        associating a cluster of data with a unique key identifier;
        encrypting the cluster of data using an encryption key;
        sending the unique key identifier and a decryption key to a server that has access to a key ID database that stores the unique key identifier and the decryption key, wherein the decryption key is interrelated to the encryption key and configured to decrypt the cluster of data that is encrypted using the encryption key;
        storing the unique key identifier in the cluster of encrypted data as metadata without storing the encryption key;
        initiating boot of a client system;
        sending a communication request to a server that has access to the key ID database;
        receiving a communication response from the server;
        sending the unique key identifier to the server;
        receiving a decryption key from the server; and
        decrypting the cluster of encrypted data using the decryption key.

2. The computing system of claim 1, wherein the encryption key and the decryption key are a symmetric key.

3. The computing system of claim 1, wherein the server is a Pre-boot Execution Environment (PXE) server, wherein the communication request is a PXE discover, and wherein the communication response is a response to the PXE discover.

4. The computing system of claim 1, wherein the request for boot code is a request for boot code via Trivial File Transfer Protocol (TFTP).

5. A method implemented by a client system for keeping encrypted data tamper resistant, comprising:
    associating a cluster of data with a unique key identifier;
    encrypting the cluster of data using an encryption key;
    sending the unique key identifier and a decryption key to a server that has access to a key ID database that stores the unique key identifier and the decryption key, wherein the decryption key is interrelated to the encryption key and configured to decrypt the cluster of data that is encrypted using the encryption key;
    storing the unique key identifier in the cluster of encrypted data as metadata without storing the encryption key;
    initiating boot of a client system;
    sending a communication request to a server that has access to the key ID database;
    receiving a communication response from the server;
    sending the unique key identifier to the server;
    receiving a decryption key from the server; and
    decrypting the cluster of encrypted data using the decryption key.

6. The method of claim 5, wherein the encryption key and the decryption key are a symmetric key.

7. The method of claim 5, wherein the server is a Pre-boot Execution Environment (PXE) server, wherein the communication request is a PXE discover, and wherein the communication response is a response to the PXE discover.

8. The method of claim 5, wherein the request for boot code is a request for boot code via Trivial File Transfer Protocol (TFTP).

* * * * *